(12) United States Patent
Bentley

(10) Patent No.: US 6,808,394 B1
(45) Date of Patent: Oct. 26, 2004

(54) SYSTEM FOR DEMONSTRATING EFFECTS OF POLARIZED LENS

(75) Inventor: Nicholas Bentley, Fleetwood, PA (US)

(73) Assignee: American Polarizers, Inc., Reading, PA (US)

( * ) Notice: Subject to any disclaimer, the term of this patent is extended or adjusted under 35 U.S.C. 154(b) by 0 days.

(21) Appl. No.: 10/602,110

(22) Filed: Jun. 23, 2003

(51) Int. Cl.[7] .............................................. G09B 25/00
(52) U.S. Cl. ...................................................... 434/365
(58) Field of Search ....................... 434/271, 365–367, 434/395, 399; 359/493, 577, 580, 581, 586, 589, 590

(56) References Cited

U.S. PATENT DOCUMENTS

| | | | |
|---|---|---|---|
| 3,962,802 A | * | 6/1976 | Kane .......................... 434/303 |
| 5,094,788 A | | 3/1992 | Schrenk et al. |
| 5,122,905 A | | 6/1992 | Wheatley et al. |
| 5,122,906 A | | 6/1992 | Wheatley |
| 5,269,995 A | | 12/1993 | Ramanathan et al. |
| 5,389,324 A | | 2/1995 | Lewis et al. |
| 5,594,830 A | | 1/1997 | Winston et al. |
| 5,808,794 A | | 9/1998 | Weber et al. |
| 5,825,542 A | | 10/1998 | Cobb, Jr. et al. |
| 5,828,488 A | | 10/1998 | Ouderkirk et al. |
| 5,867,316 A | | 2/1999 | Carlson et al. |
| 5,872,653 A | | 2/1999 | Schrenk et al. |
| 5,882,774 A | | 3/1999 | Jonza et al. |
| 5,965,247 A | | 10/1999 | Jonza et al. |
| 5,976,424 A | | 11/1999 | Weber et al. |
| 6,006,366 A | * | 12/1999 | Vondrak ......................... 2/424 |
| 6,018,419 A | | 1/2000 | Cobb, Jr. et al. |
| 6,024,455 A | * | 2/2000 | O'Neill et al. .............. 359/530 |
| 6,025,897 A | | 2/2000 | Weber et al. |
| 6,057,961 A | | 5/2000 | Allen et al. |
| 6,080,467 A | | 6/2000 | Weber et al. |
| 6,088,067 A | | 7/2000 | Willett et al. |
| 6,117,530 A | | 9/2000 | Jonza et al. |
| 6,124,971 A | | 9/2000 | Ouderkirk et al. |
| 6,141,149 A | | 10/2000 | Carlson et al. |
| 6,157,490 A | | 12/2000 | Wheatley et al. |
| 6,296,927 B1 | | 10/2001 | Jonza et al. |
| 6,382,982 B1 | * | 5/2002 | Wilcox et al. .............. 434/303 |
| 6,404,552 B1 | * | 6/2002 | Manabe ...................... 359/487 |
| 6,534,158 B2 | * | 3/2003 | Huang et al. ................ 428/201 |
| 6,557,995 B1 | * | 5/2003 | Edwards ...................... 351/47 |
| 6,572,990 B1 | * | 6/2003 | Oyama et al. .............. 428/698 |
| 6,641,900 B2 | * | 11/2003 | Hebrink et al. ............. 428/212 |
| 6,676,257 B2 | * | 1/2004 | Sheldon et al. ............... 351/49 |

* cited by examiner

Primary Examiner—Kurt Fernstrom
(74) Attorney, Agent, or Firm—RatnerPrestia

(57) ABSTRACT

A system for demonstrating the effects of a polarized lens on reducing glare is provided. The system includes a multi-layered light reflecting substrate having a visual indicia layer and a film layer which partially reflects single-axis polarized light and which partially transmits randomly polarized light. The film layer is disposed adjacent the visual indicia layer. The system also includes a polarized lens between the multi-layered light reflecting substrate and a viewer of the visual indicia. Included in the invention is a method of demonstrating the effects of a polarized lens on reducing glare in accordance with the system of the invention.

14 Claims, 2 Drawing Sheets

SYSTEM FOR DEMONSTRATING EFFECTS OF POLARIZED LENS

BACKGROUND OF THE INVENTION

It is known that glare caused by light refraction off surfaces such as roadways or waterways, particularly under rainy or otherwise wet conditions, can lead to unsafe operation of vehicles as well as eye damage over prolonged periods of exposure to those conditions. In order to prevent the effects of glare, it has long been known to use a polarized glass to eliminate the perception of glare. These lenses are commonly referred to as polarized sunglasses.

Polarization is a property arising from the wave nature of light. Unpolarized or randomly polarized light does not have a preferred plane of oscillation. Polarized light consists of waves that are oscillating in a defined and predictable manner. For example, the oscillations of linearly polarized light are confined to a specific axis perpendicular to the propagation.

With the increased usage of polarized sunglasses has come the increased is manufacture of different styles and types. Because many people still do not perceive the effects of polarized glasses on the reduction or elimination of glare, manufacturers and sellers are constantly trying to market their polarized glasses to these people. Effective marketing often includes a demonstration of the effects of placing a pair of polarized sunglasses on a wearer's face. The problem, in many sales situations, however, is that there is not much glare present so that the potential purchaser can not readily see the effects of placing the polarized lens on his or her face. This can result in reduced sales if the potential purchaser does not perceive a glare or its subsequent reduction with the use of the polarized glass.

Thus, an improved device for demonstrating to a potential customer the benefits of a polarized glass on glare reduction would allow for increased perception of glare on a given surface, as well as the concomitant reduction in that glare when the potential purchaser dons the polarized glass.

SUMMARY OF THE INVENTION

The present invention provides a system for demonstrating the effects of a polarized lens on reducing glare. The system comprises a multi-layered light reflecting substrate comprised of a visual indicia layer and a film layer which partially reflects single-axis polarized light and which partially transmits randomly polarized light. The film layer is disposed adjacent the visual indicia layer. The system also includes a polarized lens between the multi-layered light reflecting substrate and a viewer of the to visual indicia.

The invention also includes a method of demonstrating the effects of a polarized lens on reducing glare. The method comprises the steps of (a) disposing a film layer which partially reflects single-axis polarized light and which partially transmits randomly polarized light adjacent a visual indicia layer, and (b) placing a polarized lens between the film layer and a viewer of said visual indicia.

More specifically, a preferred method in accordance with the present invention comprises the steps of (a) disposing a film layer which partially reflects single axis polarized light and which partially transmits randomly polarized light adjacent a visual indicia layer, (b) allowing someone to view the visual indicia layer without a polarized lens in place between the film layer and the viewer, and (c) placing a polarized lens between the film layer and the viewer of the visual indicia to demonstrate to potential buyers of polarized glasses the effect of the polarized glasses on reducing glare.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description that follows taken in conjunction with the accompanying drawings in which:

DETAILED DESCRIPTION OF THE INVENTION

The present invention provides a means of demonstrating to a person the effects of a polarized lens, such as a pair of polarized sunglasses, on reducing glare caused by ambient light under normal living conditions. The invention comprises a visual indicia layer, such as a photograph, and a film which partially reflects single-axis polarized light and which partially transmits randomly polarized light. The film is applied to the indicia layer using known adhesives. When ambient light, such as sunlight or showroom overhead lights, shines on the photograph covered by the film, the photograph appears very glossy and the viewer perceives a great deal of glare such as might occur under driving or recreational conditions outside. When the viewer places a pair of polarized sunglasses on his or her face, the glare disappears, making the photograph or picture appear very clear and sharp.

This effect is caused by the specialized film placed on the visual indicia layer (e.g., photograph). The film partially reflects light incident on its surface, and allows the transmission of the remaining light. The portion of incident light which is reflected is polarized in a single plane or axis. This single-axis polarized light is preferably horizontally polarized, but could be vertically polarized, or polarized in any other single-axis direction. The angle of polarization is controlled by the particular film used and its orientation on the visual indicia layer.

The portion of incident light which is transmitted is then allowed to reflect off of the visual indicia layer or photograph disposed behind the film layer. This light remains randomly polarized, as it was when it came from the source (e.g., sun or overhead light). Thus, there is both randomly polarized light traveling back to the viewer, which allows the viewer to see the photograph, and also single-axis polarized light which is traveling back to the viewer, this latter light being the portion of incident light which was reflected by the polarizing film. The viewer thus experiences a perceived glare on the photograph or other visual indicia.

When the viewer then places a polarized lens in front of his or her eye, and between his or her eye and the multi-layered light reflecting substrate discussed above, the polarized lens blocks the single-axis polarized light portion, and the viewer thus perceives a reduction in the glare experienced when viewing the indicia without the lens.

Figure 1:
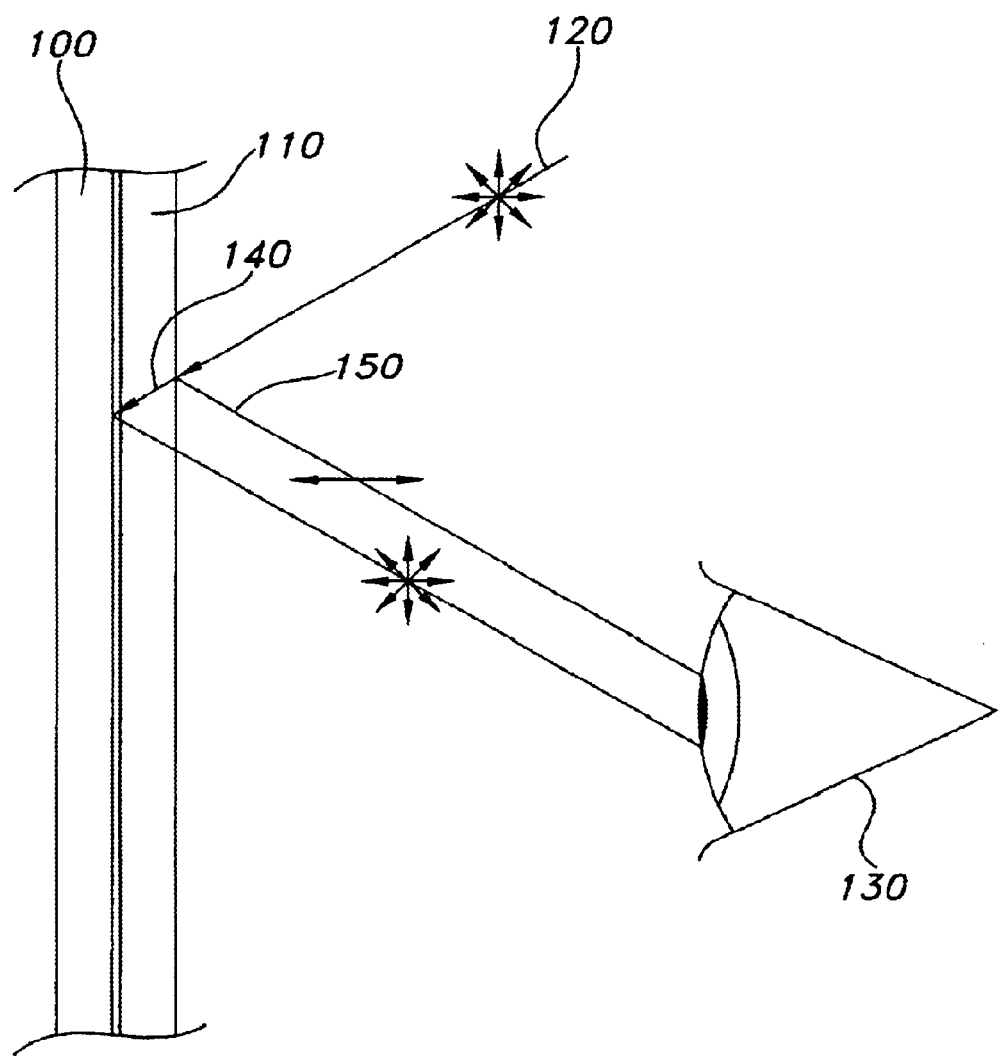
FIG. 1 shows light incident on the apparatus of the present invention and illustrates the perception of a viewer's eye as it receives that light without the presence of a polarized lens.

FIG. 1 shows visual indicia layer 100 disposed behind (from the perspective of a viewer) film layer 10. Ambient light 120 is shown as randomly polarized and is coming in overhead the eye 130 of a viewer. The cluster of arrows along the line of light 120 represents randomly polarized light. This light strikes film layer 110 and is partially transmitted to visual indicia layer 100 and partially polarized and reflected. The partially transmitted light 140 reflects off of visual, indicia layer 100 and back toward a viewer's eye 130 as still randomly polarized light. The polarized and reflected light 150 is also returned to viewer's eye 130 but as polarized on a single-axis. In the case shown in FIG. 1, the film used is disposed on visual layer 100 such that it horizontally polarizes the light.

In the situation shown in FIG. 1, the viewer perceives a great deal of glare as eye 130 receives both randomly polarized light, which allows the viewer to see the picture, as well as the polarized light reflected from film layer 110, which causes a great deal of perceived glare. At this point, the viewer can place a polarized lens in front of his or her eye and experience the reduction of that glare. The viewer now would experience an improvement in contrast and an overall increase in clarity. This part of the invention is shown in FIG. 2.

Figure 2:
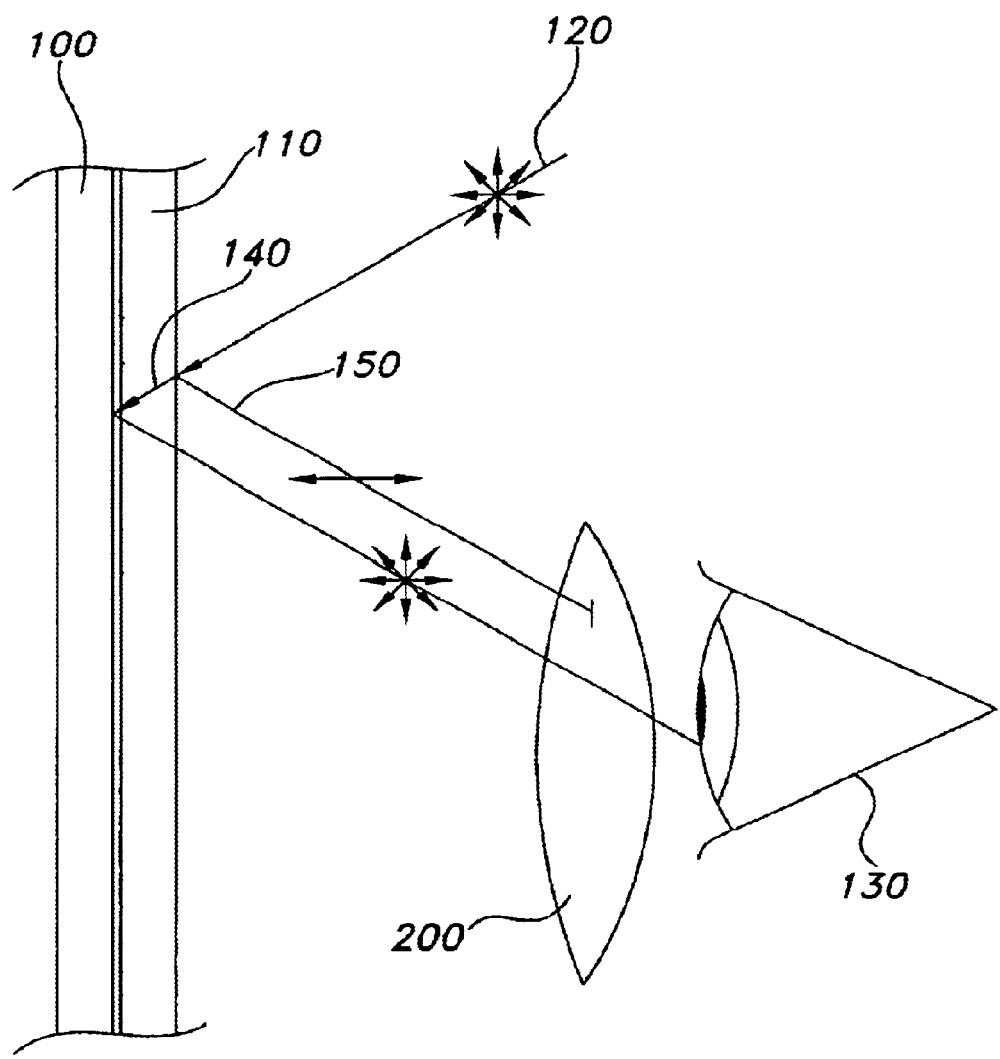
FIG. 2 shows light incident on the apparatus of the present invention and illustrates the perception of a viewer's eye as it receives that light with the presence of a polarized lens.

FIG. 2 illustrates the situation where a polarized lens 200, such as a pair of polarized sunglasses, is placed between the viewer's eye 130 and the multi-layered light reflecting substrate of the present invention. In this case, the polarized lens has a vertical axis of polarization and thus blocks (absorbs) the horizontally polarized light 150. The only light now allowed to reach the viewer's eye 130 is the randomly polarized light (absent its horizontal component). Thus, the viewer sees the picture without the heavy glare.

Because most commercial polarized sunglasses have a vertical axis of polarization, the present invention works best to show the reduction in glare where film layer 110 is of a type, and orientated such that, a horizontal polarized light is reflected. Of course, if a particular lens has an axis of polarization which is not vertical, a different film and/or different film orientation could be used to demonstrate the effect of the particular lens on reducing glare.

Different films which perform in accordance with the above description can be used over top of the visual indicia layer 100. Acceptable optical films are known which are constructed from multilayered polymeric materials. Typically these films are used on computer screens and other display devices whereby a light source exists on both sides of the screen. One such example of these films is the Vikuiti Dual Brightness Enhancement Films (DBEFs) (Vikuiti is a registered trademark of 3M). These films are reflective polarizers made using multilayer optical film technology. In the case of computer screens or other such monitors, reflective polarizer films disposed on the screen can manage light by transmitting one polarization to the viewer and reflecting the other polarization back into the display. By managing the polarization of light in this way, a display can be made to appear brighter. It is these same types of films which can be used in the present invention to demonstrate to a person the effects of a polarized lens on reducing glare.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for demonstrating the effects of a polarized lens on reducing glare, the system comprising:
   (a) a multi-layered light reflecting substrate comprised of:
      a visual indicia layer; and
         a film layer which partially reflects single-axis polarized light and which partially transmits randomly polarized light, said film layer disposed adjacent said visual indicia layer; and
   (b) a polarized lens between said multi-layered light reflecting substrate and a viewer of said visual indicia.

2. The system of claim 1 wherein said visual indicia layer is a photograph.

3. The system of claim 1 wherein the lens is a pair of polarized sunglasses.

4. The system of claim 1 wherein the single-axis polarized light is horizontally polarized.

5. The system of claim 4 wherein the polarized lens has a vertical axis of polarization.

6. A method of demonstrating the effects of a polarized lens on reducing glare, the method comprising the steps of:
   (a) disposing a film layer which partially reflects single-axis polarized light and which partially transmits randomly polarized light adjacent a visual indicia layer; and
   (b) placing a polarized lens between the film layer and a viewer of said visual indicia.

7. The method of claim 6 wherein said disposing step and said placing step occur at a point of retail sale to demonstrate to potential buyers of polarized glasses the effect of the polarized glasses on reducing glare.

8. The method of claim 6 wherein said visual indicia layer is a photograph.

9. The method of claim 6 wherein the film layer which partially reflects single-axis polarized light reflects horizontally polarized light.

10. The method of claim 9 wherein the polarized lens has a vertical axis of polarization.

11. A method of demonstrating the effects of a polarized lens on reducing glare, the method comprising the steps of:
   (a) disposing a film layer which partially reflects single-axis polarized light and which partially transmits randomly polarized light adjacent a visual indicia layer;
   (b) allowing someone to view the visual indicia layer without a polarized lens in place between the film layer and the viewer; and
   (c) placing a polarized lens between the film layer and the viewer of the visual indicia to demonstrate to potential buyers of polarized glasses the effect of the polarized glasses on reducing glare.

12. The method of claim 11 wherein said visual indica layer is a photograph.

13. The method of claim 11 wherein the film layer which partially reflects single-axis polarized light reflects horizontally polarized light.

14. The method of claim 13 wherein the polarized lens has a vertical axis of polarization.

* * * * *